United States Patent Office 3,288,888
Patented Nov. 29, 1966

3,288,888
ACRYLONITRILE VINYLIDENE CHLORIDE
POLYMER BLEND COMPOSITIONS
Erwin Wieckowski, Raleigh, N.C., assignor to Monsanto
Company, a corporation of Delaware
No Drawing. Filed May 14, 1963, Ser. No. 280,456
2 Claims. (Cl. 260—898)

This invention relates to improved acrylonitrile polymer compositions. More particularly, the invention relates to acrylonitrile-vinylidene chloride polymer blend compositions having improved flame resistance and good dyeability.

Acrylonitrile polymer compositions have been used to prepare a wide variety of fibers, filaments, films and other shaped articles useful in many textile and other product application. However, these otherwise excellent fibers suffer from a lack of substantial flame resistance. Attempts to remedy this deficiency have been many and varied. Copolymerization of acrylonitrile with certain other monomers such as vinyl chloride or vinylidene chloride resulted in considerable improvement in flame resistance, but the product was of inferior quality with respect to other end uses such as dyeability, wet shrinkage and wrinkle recovery. When an amount of modifier is copolymerized with acrylonitrile sufficient to give a desirable improvement in flame resistance, it is usually found that the resulting fibers have such low sticking temperatures and high shrinkage at elevated temperatures that they are not suitable for most textile purposes. For example, when acrylonitrile is copolymerized with from 20 to 40 percent of vinylidene chloride or vinyl chloride, the resulting fibers show improved flame resistance, but their sticking temperature is below 150° C. and they shrink a considerable amount in length in boiling water or steam. Attempts were made to improve flame resistance and at the same time to preserve dye affinity and other properties by either blending chlorine containing polymeric compositions with a dyeable acrylonitrile polymer composition or grafting chlorine containing polymer compositions on to dyeable acrylonitrile polymer compositions. However, a lack of compatibility of vinyl chloride or vinylidene chloride with acrylonitrile polymers frequently resulted in a separation of spinning solutions into two liquid phases and the resulting fibers were of inferior quality due to segmentation. The term "compatible" refers to the condition of a spinning solution when two polymers are dissolved in a common solvent and, upon mixing, blend into a single homogeneous phase having uniform viscosity and refractive index. The fibers spun from such a solution will show uniform cross-section and denier. If the two solutions are distinguishable, after mixing, either visually or by normal testing means, an "incompatibility" of the polymers is said to exist which would interfere with proper fiber production. Obviously, such incompatible solutions are not adaptable for large scale spinning operations.

Accordingly, it is an object of this invention to provide acrylonitrile vinylidene chloride polymer blend compositions having improved flame resistance without loss or deterioration of other desirable properties.

It is another object of the invention to provide a process for the preparation of acrylonitrile-vinylidene chloride polymer blend compositions.

An additional object of this invention is to provide flame resistant, dyeable fibers, filaments, films and other shaped articles prepared from acrylonitrile-vinylidene chloride polymer blend compositions.

Other objects and advantages of the invention will become apparent from the disclosure which follows.

In general, the objects of the invention are accomplished by blending two polymeric components, one of which consists of a copolymer of acrylonitrile and vinylidene chloride and the other consisting of a copolymer, terpolymer, interpolymer or blend containing a major proportion, 70 percent or more, of acrylonitrile. The two blending components are dissolved in a common solvent, mixed or blended together in solution to form a completely compatible blending composition and then spun by conventional wet spinning procedures to form a fiber containing a major proportion of acrylonitrile and a substantial proportion of vinylidene chloride.

The portion of the blend which contains acrylonitrile but no vinylidene chloride will be referred to as polymer A and includes acrylonitrile homopolymers and copolymers, terpolymers, and blends of acrylonitrile containing at least 70 percent acrylonitrile by weight and up to 30 percent by weight of a copolymerizable component which may consist of one or more polymerizable compositions.

For example, polymer A may be a copolymer of from 80 to 98 percent acrylonitrile and from 2 to 20 percent of another monomer containing the $>C=C<$ linkage and copolymerizable with acrylonitrile. Suitable mono-olefinic monomers include acrylic, alpha-chloroacrylic and methacrylic acids; the methacrylates such as methylmethacrylate, ethyl methacrylate, butyl methacrylate, octyl methacrylate, methoxymethyl methacrylate, beta-chloroethyl methacrylate, and the corresponding esters of acrylic and alpha-chloroacrylic acids; methacrylonitrile; acrylamide and methacrylamide, alpha-chloroacrylamide or monoalkyl substitution products thereof; methyl vinyl ketone; vinyl carboxylates such as vinyl acetate, vinyl chloroacetate, vinyl propionate and N-vinylsuccinimide; methylene malonic esters; itaconic ester; N-vinylcarbazole; vinyl furane; alkyl vinyl ethers; vinyl sulfonic acid; ethylene alpha-, beta-dicarboxylic acids or their anhydrides or derivatives such as diethyl fumarate, diethyl maleate, diethyl citraconate, diethylmesaconate; styrene; vinyl naphthalene; acenaphthalene; vinyl-substituted tertiary heterocyclic amines, such as the vinylpyridines, 2-vinylpyridine, 4-vinylpyridine, 5-methyl-2-vinylpyridine, etc., 1-vinylimidazole and alkyl-substituted 1-vinylimidazoles, such as 2-, 4-, or 5-methyl-1-vinylimidazole, and other $>C=C<$ containing copolymerizable materials.

The polymer may be a ternary interpolymer, for example, products obtained by the interpolymerization of acrylonitrile and two or more of any of the monomers enumerated above. The ternary polymers may contain, for example, from 80 to 97 percent of acrylonitrile, from 1 to 10 percent of a vinylpyridine or a 1-vinylimidazole, and from 1 to 18 percent of another substance, such as methacrylonitrile.

The polymer may also be a blend of from 50 to 98 percent of polyacrylonitrile or of a polymer containing from 80 to 99 percent acrylonitrile and from 1 to 20 percent of at least one other $>C=C<$ containing substance copolymerizable with acrylonitrile, with from 2 to 50 percent of a blending polymer of from 10 to 70 percent of acrylonitrile and from 30 to 90 percent of at least one other $>C=C<$ containing polymerizable monomer. Preferably, when the polymeric material comprises a blend, it will be a blend of (1) a copolymer of 90 to 98 percent of acrylonitrile and from 2 to 10 percent of another mono-olefinic monomer such as vinyl acetate, with (2) a sufficient amount of a copolymer of from 10 to 70 percent of acrylonitrile and from 30 to 90 percent of a vinyl-substituted tertiary heterocyclic amine, such as vinylpyridine, methyl vinylpyridine or 1-vinylimidazole, the two blending polymers being so as to give a dyeable blend having an overall vinyl-substituted tertiary heterocyclic amine content of from 2 to 10 percent based on the weight of the blend.

The polymer A compositions may also contain small amounts of dyeability improvement components such as itaconic acid, methallyloxybenzene sulfonate, allyloxybenzene sulfonate, vinylbenzene sulfonate, sodium paramethacrylamidobenzene sulfonate, and other ingredients to further enhance dyeability.

The acrylonitrile-vinylidene chloride portion of the blend compositions will be referred to as polymer B. Polymer B consists of a copolymer containing acrylonitrile and vinylidene chloride only. The proportion of acrylonitrile to vinylidene chloride may vary widely from 30 percent acrylonitrile and 70 percent vinylidene chloride to as high as 85 percent acrylonitrile and 15 percent vinylidene chloride. Compositions containing more than 50 percent vinylidene chloride are generally not compatible with polymer A.

The overall ratio of polymer A to polymer B may also vary considerably. The ratio may be from 2 to 98 parts to as high as 98 to 2 parts of polymer A to polymer B. Preferably, the range should be 80:20 to 70:30 on a polymer A to a polymer B basis so that the overall percent of acrylonitrile in the final blended composition might preferably be 70 percent at minimum and more preferably at least 80 percent acrylonitrile.

The A polymers useful in the practice of the present invention may be prepared by any conventional polymerization procedures such as mass polymerization, solution polymerization or aqueous emulsion procedures. The preferred practice utilizes suspension polymerization wherein the polymer is prepared in finely divided form for immediate use in the fiber operation. The preferred suspension polymerization may utilize batch procedures wherein monomers are charged with aqueous medium containing the necessary catalysts and dispersing agents. A more desirable method involves a semi-continuous procedure in which the polymerization reactor containing the aqueous medium is charged with desired monomers gradually throughout the course of the reaction. Entirely continuous methods involving the gradual addition of monomers and the continuous withdrawal of polymer may also be employed.

The most effective polymers for the preparation of fibers are those of uniform physical and chemical properties and of relatively high molecular weight. Polymer should have weight average molecular weights of at least 10,000 and preferably between about 25,000 and 150,000.

The polymer B compositions differ radically in compatibility with polymer A compositions depending on the type of polymerization procedure used. It has been found that the polymer B compositions may be prepared by the solution, suspension or emulsion techniques but they are not compatible for purposes of this invention when their preparation is conducted by conventional suspension technique. The polymerization reaction is preferably conducted with free radical or redox catalysts although ionic or co-ordination catalysts may be used. Conventional free radical initiators, for example, azodiisobutyronitrile and redox catalyst systems comprising a peroxy catalyst such as potassium persulfate and a sulfoxy reducing agent in which the sulfur does not have a valence in excess of four, such as sodium hyposulfite, sodium metabisulfite and sulfur dioxide may be used. Using the emulsion technique, emulsifiers such as water soluble salts of fatty acids, "amino soaps" such as salts of triethanolamine, nonyl phenoxy poly(ethyleneoxy) ethanol, various sulfonated aliphatic polyesters and other anionic, cationic, nonionic or ampholytic emulsifiers are added to the reaction medium to aid in conversion from monomer to polymer. An emulsifier is essential for the copolymerization of acrylonitrile-vinylidene chloride monomers in aqueous medium, particularly when the vinylidene chloride content in the monomer mixture is high, to assure adequate yield and chemical uniformity of the resulting cooplymer.

In preparing the products of the present invention, conventional equipment ordinarily employed in the manufacture of artificial and synthetic fibers and filaments may be used and particularly and equipment which is usually employed in the manufacture of fibers and filaments from acrylonitrile polymers. The present invention is applicable to the usual methods for forming synthetic filaments and fibers such as dry spinning and wet spinning. Any of the well known prior art solvents, for example, dimethyl acetamide, dimethyl formamide, dimethyl sulfoxide, nitric acid, concentrated aqueous solutions of certain salts such as sodium thiocyanate, zinc chloride and the like may be used in the practice of the invention. Coagulation baths, consisting essentially of a solution of solvent and non-solvent, orientation and washing methods normally used in solution spinning are suitable for preparing the fibers of the invention.

In preparing the compositions of this invention, it will be understood that they may contain further modifying ingredients such as heat and light stabilizers, delusterants, plasticizers, anti-static agents, lubricants, optical brighteners and other like modifying agents without departing from the scope of the invention and without detrimental effects from the addition of such additives, whether added before, during or after spinning.

The fibers of the invention, prepared from the A–B polymer blend containing a given amount of chlorine, have flame resistance equivalent to fibers obtained from a blend of polymer A with vinyl chloride homopolymer, the latter blend containing the same percent of chlorine. The basic dye acceptance of the fibers of the invention is equivalent to that of commercially available fibers made from copolymers of acrylonitrile. Acceptable flame resistance, particularly for carpet application, requires that the fiber contain around 5 to 8 percent, by weight, of chlorine, preferably about 7 percent chlorine. Thus, the A polymer portion of the blend gives dyeability and the B polymer portion flame resistance. Vinylidene chloride has a sufficiently high chlorine content to make its use in flame resistant applications attractive but it is only by the unique combination of ingredients and careful control of polymerization conditions in this invention that a blend composition has been discovered which solves the compatibility problem and yet gives a vinylidene chloride containing composition that is soluble in commercially feasible solvents such as dimethyl acetamide and dimethyl formamide. The A–B fibers are homogeneous with the components so finely interdispersed that no phase separation can be detected microscopically. In addition, light fastness, initial and heated color and homogeneity are outstanding characteristics of the compositions of this invention. Carpets made from the A/B blends of this invention show residual compression and height retention comparable to commercially available samples. Carpet samples prepared from the A/B blends of this invention were tested for their flame resistance by the so-called match test. In this test a swatch of carpet fabric measuring 8 inches by 10 inches is placed in a draft free enclosure. Ten safety-type matches are ignited one at a time and placed randomly on the surface of the carpet. The resistance of the test sample to flame is expressed as that percentage of the 10 matches from which flame propagation did not occur. A test rating of 100 percent indicates that all of the ignited matches failed to propagate flame.

The following examples are presented as a further disclosure and illustration of the improved products of this invention and are not intended as a limitation thereof. In the examples, all parts, proportions and percentages are by weight unless otherwise indicated.

EXAMPLE I

In this example the basic dye acceptance of fibers prepared from an A/B blending composition was measured on annealed scoured 3 denier per filament samples. The A polymer portion consisted of a copolymer containing 93 percent acrylonitrile and 7 percent vinyl acetate and the B polymer portion consisted of a copolymer containing 60 percent acrylonitrile and 40 percent vinylidene chloride. As a comparison, a copolymer containing 93 percent acrylonitrile and 7 percent vinyl acetate was also tested for basic dye acceptance. In all cases the basic dye acceptance of the A/B blend was found to be equivalent or better than that of the acrylonitrile copolymer.

The acrylonitrile-vinylidene chloride ($AN/VCl_2$) copolymer was prepared as follows. To the reactor was added 720 ml. of water and 4 gm. of nonyl phenoxy poly(ethyleneoxy) ethanol as an emulsifier and the vessel immersed in a constant temperature bath suitable to maintain a temperature of 30° C. Nitrogen was continuously bubbled throughout the reactor. A redox catalyst-initiator system using potassium persulfate-sodium hyposulfite in a 2 percent by weight concentration was used. A cold monomer mixture of acrylonitrile-vinylidene chloride in the weight ratio of 60:40 was prepared. Activator, catalyst and monomer mixture were added to the reactor at a steady rate and continuously for the period of 2 hours. After the above solutions were exhausted, the reaction was allowed to continue for an additional one-half hour. The product was then transferred to a large beaker, diluted with water, filtered, washed and reslurried three times, dried at 55° C. and then passed through a 40 mesh screen. The resulting polymer had a specific viscosity of 0.13 as measured at a concentration of 0.1 gram per deciliter in dimethyl formamide at 25° C., and a final vinylidene chloride content of 39.6 percent. This acrylonitrile-vinylidene chloride copolymer in a 60:40 acrylonitrile to vinylidene chloride ratio was blended with an acrylonitrile-vinyl acetate (AN/VA) copolymer containing 93 percent acrylonitrile and 7 percent vinyl acetate. The two blending ingredients were prepared for spinning in a 25 percent solids content spinning solution in the usual manner of the prior art, the blending compositions being dissolved in dimethyl acetamide at a temperature of approximately 70° C. The resulting dope or spinning solution was completely homogeneous with no separation of phases occurring even on long standing of upwards to 12 hours. The spinning followed standard wet spinning procedures of the prior art using a coagulation bath consisting of 88 percent polyethylene glycol of 1000 molecular weight and 12 percent solvent at 90–95° C., with the resulting fiber containing 7 percent chlorine by weight. The results of the standard basic dye acceptance test (BDA) are shown in Table I. Fibers were tested with and without various percentages of stabilizers. $\Delta P$ and $\Delta Br$ refer to changes in purity and brightness as measured by G.E. spectrophotometer after heating at 145° C. for 25 minutes. All of the blends contained 25 percent $AN/VCl_2$ (which contains 39.6 vinylidene chloride).

*Table I*

| Fiber | $\Delta P$ | $\Delta Br$ | BDA |
|---|---|---|---|
| AN/VA (93/7) copolymer-control | 2.8 | 3.1 | 9.5 |
| Blend of AN/VA with $AN/VCl_2$ | 5.3 | 7.2 | 9.14 |
| Blend of AN/VA with $AN/VCl_2$ plus 1% tri-isopropanolamine borate | 4.4 | 6.0 | 9.53 |
| Blend of AN/VA with $AN/VCl_2$ plus 2% tri-isopropanolamine borate | 5.9 | 7.6 | 9.12 |
| Blend of AN/VA with $AN/VCl_2$ plus 1% di-butyltin oxide | 6.3 | 8.2 | 9.25 |
| Blend of AN/VA with $AN/VCl_2$ plus 2% di-butyltin oxide | 6.3 | 7.8 | 8.80 |
| Blend of AN/VA with $AN/VCl_2$ plus 3% di-butyltin oxide | 6.3 | 7.4 | 8.84 |

From the knowledge of chemical compositions of polymer A and polymer B, the weight percentage of polymer B in the blend A–B, required to give $b$ (percent acrylonitrile in the blend) can be calculated. The chlorine content of this blend can then be found readily.

The general equations are $$(1) \quad x = \frac{(c-b)}{(c-a)} \times 100$$

and $$(2) \quad z = \frac{(100-a)(c-b)}{(c-a)} \times .732$$

where $z$ = percent chlorine in the blend
$x$ = percent acrylonitrile/vinylidene chloride copolymer in the blend
$a$ = percent acrylonitrile in $AN/VCl_2$ copolymer (polymer B)
$b$ = percent acrylonitrile in the blend
$c$ = percent acrylonitrile in polymer A Thus, where $c=93$, $b=85$ and $a=30$, the chlorine content would be 6.5 percent of the blend.

EXAMPLE II

The compatibility of the various blend compositions of the invention was tested using a wide range of compositions. The results are shown below in Table II. Compatibility was determined by preparing 100 g. of 5 percent solids solution of various $AN/VCl_2$ copolymers and adding it to 100 g. of 12.5 percent solids solution of AN/VA (93–7). The mixed solutions were stirred for 30 minutes and allowed to stand for a few hours. "Full compatibility" was indicated by the solution appearing perfectly clear and homogeneous by visual observation. Where the solution was homogeneous but not completely clear, microscopic examination was necessary before classifying it either as "non-compatible" (two phases visible under the microscope) or "fairly compatible." Variations in the method of polymerization of the $AN/VCl_2$ copolymer are shown by indication of the polymerization medium and catalyst to activator ratios ($K_2S_2O_8$ and $SO_2$).

*Table II*

| Percent $K_2S_2O_8$ | Percent $SO_2$ | Medium | Percent $VCl_2$ | Compatibility |
|---|---|---|---|---|
| 2.0 | 2.0 | t-Butanol-$H_2O$ 65/35 | 47.0 | Fully compatible. |
| 1.5 | 1.5 | do | 45.6 | Do. |
| 1.0 | 1.0 | do | 38.7 | Do. |
| 2.0 | 2.0 | Aqueous plus emulsifier | 37.7 | Do. |
| 2.0 | 2.0 | $CH_3COOH$-ethanol-$H_2O$ | 35.8 | Do. |

EXAMPLE III

As a further test of compatibility, various polymer A compositions were blended with polymer B compositions having 60/40 and 55/45 ratios of AN to $VCl_2$. Full compatibility was observed with most blends. In addition to visual observation, a microscopic examination of film cast from each blend was conducted. The results are summarized in Table III.

*Table III*

| Blend B/A=2/5 | Compatibility |
|---|---|
| AN/VA/$VCl_2$ (85/8/7) + AN/$VCl_2$ (60/40) | Full Compatibility. |
| AN/MA (94/6) + AN/$VCl_2$ (60/40) | Do. |
| AN/VA/styrene (91/7/2) + AN/$VCl_2$ (60/40) | Do. |
| AN/VA/$VCl_2$ (85/8/7) + AN/$VCl_2$ (55/45) | Do. |
| AN/VA/styrene (91/7/2) + AN/$VCl_2$ (55/45) | Do. |
| AN/MA (94/6) + AN/$VCl_2$ (55/45) | Fairly Compatible. |
| AN/VA (93/7) + AN/$VCl_2$ (60/40) | Full Compatibility.[1] |

[1] Over complete range of 98/2 to 2/98.

EXAMPLE IV

In this example fabrics prepared from $AN/VCl_2$ (60/40) blended with AN/VA (93/7) and containing 6 or more percent chlorine were found to be completely flame resistant when tested in accordance with the Standard Test Method No. 33–1962, as described in the Proceedings of the American Association of Textile Chemists and Colorists (Oct. 15, 1962).

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the present invention is intended to be included within the scope of the claims.

I claim:

1. A new composition of matter comprising a visually compatible blend of 75 percent of
   (A) an acrylonitrile polymer comprising a blend of 80 to 99 percent of (a) a copolymer containing 80 to 98 percent acrylonitrile and 2 to 20 percent of another monoolefinic monomer other than vinylidene chloride and 1 to 20 percent of (b) a copolymer containing 10 to 70 percent acrylonitrile and 30 to 90 percent of a vinyl-substituted tertiary heterocyclic amine, said blend having an overall vinyl-substituted tertiary amine content of 2 to 10 percent based on the weight of the blend with 25 percent of
   (B) an acrylonitrile-vinylidene chloride copolymer containing 60 percent acrylonitrile and 40 percent vinylidene chloride.

2. A new composition of matter comprising a compatible blend of from 2 to 98 percent of
   (A) an acrylonitrile polymer containing at least 70 percent acrylonitrile and up to 30 percent of at least one ethylenically unsaturated monomer copolymerizable therewith other than vinylidene chloride and a dyeability enhancer selected from the group consisting of methallyloxybenzene sulfonate, acrylamidobenzene sulfonic acid and cinnamic acid with from 98 to 2 percent of
   (B) an acrylonitrile vinylidene chloride copolymer containing less than 50 percent vinylidene chloride.

References Cited by the Examiner

UNITED STATES PATENTS

| | | | |
|---|---|---|---|
| 2,841,568 | 7/1958 | Craig et al. | 260—898 |
| 3,029,214 | 4/1962 | Hobson | 260—895 |

MURRAY TILLMAN, *Primary Examiner.*

SAMUEL H. BLECH, *Examiner.*

J. WHITE, *Assistant Examiner.*